Patented Aug. 24, 1937

2,090,938

UNITED STATES PATENT OFFICE 2,090,938

AZO DYESTUFFS

Karl F. Conrad, Buffalo, N. Y., assignor to National Aniline & Chemical Company, Inc., New York, N. Y., a corporation of New York No Drawing. Application July 28, 1933
Serial No. 682,625

20 Claims. (Cl. 260—72)

This invention relates to a new class of azo dyes and products containing the same, as well as methods for the production thereof. It relates especially to new azo dyes soluble in benzene and related solvents and to processes of producing them.

An object of the present invention is to provide a new class of azo dyestuffs, some members of which are soluble in oils, fats, waxes, resins, compositions containing them, lacquers (containing resins and/or cellulose derivatives), and the like; and other members of which are suitable for the dyeing of textile fibers.

Another object of the present invention is to provide material colored and/or dyed with said dyestuffs.

A further object of the present invention is to provide a new class of azo dyestuffs suitable for the coloring of compositions of matter containing oils, fats and waxes; and especially varnishes, wood stains, printing and stamping inks, shoe polishes, shoe creams, gasoline, candles, etc.

An additional object of the present invention is to provide a class of black azo dyestuffs soluble in oils, fats, waxes, resins, and the like; and especially in benzene, amylacetate, turpentine, gasoline, paraffin wax, castor oil, and bakelite and other synthetic resins.

Further objects of the present invention are to provide processes of preparing said dyestuffs and said compositions.

Other objects of the present invention will in part be obvious and will in part appear hereinafter.

I have found, in accordance with the present invention, that new azo dyestuffs can be obtained by coupling a diazotized aromatic amino compound, preferably one containing at least one substituted benzene nucleus or a naphthalene nucleus, with a product which will be identified more fully hereinafter and which will be referred to herein as an "alkylated naphthol". I have found, furthermore, that those dyestuffs are of particular value which are produced with the aid of an alkylated naphthol derived from beta-naphthol.

The invention accordingly comprises the products having the characteristics and properties, and the steps and their relation employed in the preparation of the products, all of which are exemplified in the products and processes hereinafter disclosed. The scope of the invention is indicated in the appended patent claims.

The alkylated naphthols employed in accordance with the present invention are members of the class of compounds which have the empirical structural formula

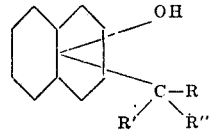

in which R represents a hydrocarbon radical and R' and R'' each represent hydrogen or a hydrocarbon radical, or R and R' are part of the same non-aromatic carbocyclic radical the radical

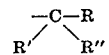

containing at least 3 carbon atoms. The said alkylated naphthols may be produced by reacting alpha- or beta-naphthol, or a mixture of the two, with an alcohol containing at least 3 carbon atoms, or mixture of such alcohols, in the presence of a suitable dehydrating agent, or by the action of a suitable unsaturated hydrocarbon on the naphthol. Those alkylated naphthols are of particular interest in connection with the present invention which are derived from beta naphthol and contain a branched-chain alkyl radical.

In order to illustrate a typical method of producing the alkylated naphthols employed in accordance with the present invention, the following example is cited. It is to be understood, however, that the invention is not limited to the specific method of operation or to the reaction product obtained as described therein. The parts are by weight.

*Example 1.*—A mixture of 144 parts of beta-naphthol, 150 parts of isobutyl alcohol, and 300 parts of fused anhydrous zinc chloride is heated to gentle boiling under a reflux condenser for about 12 hours. The resulting reaction mixture separates into two layers. On cooling, the upper layer, which contains the alkylated naphthol reaction product, is removed and washed with water by decantation until the wash water is clear. The product is then further washed, first with dilute hydrochloric acid (about 1 per cent. strength) and finally with water until free from acid, and is then dried. The crude product thus obtained is a viscous liquid.

In a similar manner, other products included in the class of alkylated naphthols (as the term is employed herein) may be prepared from alpha- or beta-naphthol and other alcohols. Proportions of one mol. of naphthol to from 2 to 2.5 mols of the alcohol and 2 to 2.5 mols of anhydrous zinc chloride are preferably employed, and the reaction is preferably carried out for a period of about 8 to about 12 hours. Among the alcohols that may be used in producing the intermediates are the various propyl, butyl, amyl and hexyl alcohols, cyclohexyl alcohol, benzyl alcohol, etc. Either alpha or beta-naphthol or a mixture thereof may be used. Furthermore, dehydrating or condensing agents other than anhydrous zinc chloride may be employed; but preferably those are used which are also anhydrous metallic halides, as for example, aluminum chloride, ferric chloride, etc.

The reaction of the above example results in the replacement of one of the hydrogen atoms of the naphthol nucleus by a butyl radical, and, hence, the reaction product, herein referred to as "isobutylated beta-naphthol", is essentially a homologue of the naphthol, no more than a small proportion of ether bodies, if any, being present in the product.

The alkylated naphthols, produced as described above, may be purified in any suitable manner; as by fractional distillation, preferably under a vacuum. Although in the crude or technical state they are generally viscous liquids, in the pure or purified state they are generally solids at ordinary room temperature. The crude or technical alkylated naphthol products, as well as the pure or purified alkylated naphthols may be used for many purposes; as for example, as antiseptics, germicides, insecticides, as well as for the production of azo dyestuffs in accordance with the present invention. It will be noted, however, that it is not necessary to employ a pure alkylated naphthol in the making of azo dyes in accordance with the present invention, or to isolate any one specific compound from the crude or technical alkylated naphthol product for use in connection with the present invention; and that in many cases the crude or partially purified alkylated naphthols give satisfactory, and sometimes superior, results in the production of dyes in accordance with the present invention.

In the preparation of the dyestuffs of the present invention in accordance with one method of procedure, a diazotized aromatic amino compound, preferably containing at least one substituted benzene nucleus or a naphthalene nucleus is coupled with an alkylated naphthol, preferably in an alkaline coupling medium, whereby an azo dyestuff is produced. The resulting azo dyestuff may be separated from the reaction mixture in any manner well known to the art for the separation of similar compounds. If it is desired to produce a dyestuff which is suitable for dyeing textile fibers, the diazotized amino compound or the "alkylated naphthol", or both, should contain at least one acid salt-forming group (especially a sulfo or carboxyl group). If it is desired to produce a dyestuff soluble in oils, fats and waxes, neither the diazotized amino compound nor the alkylated naphthol should contain an acid salt-forming group. If the alkylated naphthol is derived from 2-naphthol (beta-naphthol), the 1-position should be free from substituents; and if it is derived from 1-naphthol (alpha-naphthol), the 2- or 4-position should be free from substituents.

In general, the coupling is carried out by adding the diazo compound to a suspension or solution of the alkylated naphthol in an alkaline medium. In carrying out the coupling in accordance with a preferred method of procedure, the alkylated naphthol is dissolved in an alcohol; the alcoholic solution is added with stirring to an iced solution of dilute caustic alkali, so as to convert it into the form of a suspension or solution advantageous for coupling; and the diazotized amino compound is added to the resulting solution or suspension, preferably as soon as prepared. The solution or suspension is preferably used immediately for coupling since it tends to form a tar upon standing.

Various diazotized bodies may be coupled with the alkylated naphthols, depending upon the character of the dyestuff to be produced; and they may be produced by diazotizing, tetrazotizing, etc., aromatic monoamines or polyamines, as well as aromatic amino-azo compounds containing one or more amino and/or azo groups. For the purpose of clarity of definition, the term "diazotized" as applied to aromatic amines is employed herein in its generic, as well as specific, sense to indicate that the aromatic amines which may contain one or more amino groups are converted to their corresponding diazo, tetrazo, etc., compounds.

Thus the alkylated naphthols may be coupled with diazotized amino compounds of the benzene, naphthalene or diphenyl series; as for example diazotized aromatic amines having the formula $$x\text{—}A\text{—}NH_2$$

in which A is an aromatic radical containing at least one substituted benzene nucleus or a naphthalene nucleus, and $x$ is hydrogen or a carboxyl or a sulfo group; or they may be coupled with a diazotized aromatic amine having the formula $$K\text{—}NH_2$$

in which K represents a benzene or naphthalene nucleus, and especially with a tetrazotized aromatic polyamino compound or polyaminoazo compound having the formula $$H_2N\text{—}Y'\text{—}(N\text{=}N\text{—}Y)_n\text{—}NH_2$$

in which Y and Y' are the same or different aromatic radicals of the benzene, naphthalene or diphenyl series, and $n$ is 1 or more.

In general, the dyestuffs of the present invention resulting from the coupling of a diazotized amino compound which does not contain an acid salt-forming group with an alkylated naphthol, and particularly with an isobutylated naphthol, are dark, friable powders which can be readily crushed and powdered, and can be mixed in the dry form with other solid oil soluble colors for shading purposes. They are insoluble in water, slightly soluble in alcohol, but are soluble to a greater or lesser extent in oils, fats, waxes and other organic solvents; as for example, coal tar oils (benzene, toluene, solvent naphthol, etc.), petroleum hydrocarbons (benzine, gasoline, kerosene, paraffin, etc.), organic basic oils (aniline, toluidine, xylidines, pyridine, etc.), vegetable oils (China-wood oil, castor-oil, turpentine, linseed oil, etc.), beeswax, montan wax, organic esters (ethyl acetate, butyl acetate, diethyl phthalate, dibutyl phthalate, etc.), ketones (cyclohexanone, acetone, etc.), and the like. In general they have high tinctorial power; for example; 1 part of the trisazo dyestuff derived from (4'-aminophenyl)-4-azo-1-naphthylamine and isobutylated beta-naphthol (described in Example 2 below) dissolved in 50 parts of gasoline forms a violet colored solution.

In order to illustrate the products which may be obtained in accordance with the present invention and the preferred process of producing such products, the following additional examples are given. The parts are by weight:

Example 2

*Part I.*—13.8 parts of p-nitraniline are diazotized and coupled into 14.3 parts of alpha-naphthylamine in any well-known manner, and the resulting monazo dye, which occurs as a precipitate, is isolated by filtration. The monazo dye thus obtained is then reduced by treating it in 1050 parts of alcohol at boiling temperature with 45 parts of 60 per cent sodium sulfide previously dissolved in 64 parts of water. When the reduction is complete, the reaction mixture is cooled to 50° C. and filtered from any suspended matter which may be present. The filtrate is added to 3000 parts of water and the dyestuff is salted out by addition of common salt. The product thus obtained is p-aminobenzene-azo-alpha-naphthylamine and has the following probable formula:

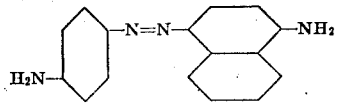

26.2 parts of this body are suspended in about 1400 parts of water and 58 parts of 20° Bé. hydrochloric acid and tetrazotized at 0° to 5° C. by addition of 14 parts of sodium nitrite dissolved in water.

*Part II.*—40 parts of crude isobutylated beta-naphthol (produced as described in Example 1) are dissolved in 400 parts of 95 per cent. ethyl alcohol, and the resulting solution is poured into a solution of 15 parts of sodium hydroxide in 1800 parts of water. There results a suspension of the isobutylated beta-naphthol in finely divided form.

*Part III.*—The solution of the tetrazotized aminoazo compound resulting from the process of Part I and at a temperature of 0° to 5° C. is added to the suspension of isobutylated beta-naphthol resulting from the process of Part II and at a temperature of 0° to 5° C., and the mixture is stirred at 0° to 5° C. for about 16 hours. The product, which is present in the form of a precipitate, is filtered off, washed with water until free from alkali and chlorides, and dried at 80° to 90° C.

The coloring matter thus obtained appears to be a trisazo body having the following probable formula:

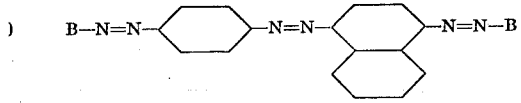

in which B represents the isobutylated beta-naphthol radical. It is a bronzy black powder insoluble in water, soluble in concentrated sulfuric acid giving a blue solution which upon dilution with water gives a violet solution, soluble in benzene giving a black solution, soluble in ethyl acetate, turpentine, gasoline, and castor-oil to produce reddish-violet to black solutions, and very slightly soluble in denatured alcohol. It may accordingly be incorporated into compositions containing these and related oils, fats and waxes to produce corresponding black compositions; as for example, nitrocellulose lacquers, resins, varnishes, wood stains, printing and stamping inks, artificial leathers, patent leather, shoe polishes, shoe creams, soaps, candles, gasoline, etc. Thus it may be advantageously employed instead of the nigrosine salts of stearic, oleic and other fatty acids formerly employed for this purpose; since it does not have the objectionable properties of said salts, such as retarding drying, smearing when crushed or ground, and melting at relatively low temperatures.

By substituting dichlor-p-nitraniline for the p-nitraniline of the above Example 2, a dyestuff is obtained which is soluble in benzene and the other related organic solvents to produce a brown solution. Furthermore, by employing capryl beta-naphthol (derived from capryl alcohol and beta-naphthol in the manner described in Example 1) instead of the isobutylated beta-naphthol of the above Example 2, a dystuff is obtained which is soluble in oils, fats and waxes to produce a brownish-black solution.

Example 3

*Part I.*—To a solution of 5 parts of p-aminobenzene-azo-alpha-naphthylamine which has been tetrazotized by the method described in Example 2, there is slowly added, with stirring and in the presence of ice, a hot solution of 9 parts of 2-ethoxy-1-naphthylamine hydrochloride dissolved in 400 parts water containing 5.8 parts of 20° Bé. hydrochloric acid, and to the mixture there is added an excess of sodium acetate over that required to neutralize the mineral acid acidity. The mixture is stirred until the coupling is completed (about 8 to 10 hours). It is then heated to 70° C. and the precipitated dyestuff is filtered off and washed with water containing a little hydrochloric acid. The trisazo dye thus obtained is slurried with 300 parts of water and 19.5 parts of 20° Bé. hydrochloric acid, cooled to 0° C., and tetrazotized by the addition of 3 parts of sodium nitrite. About 10 to 16 hours are required to complete the tetrazotization.

*Part II.*—A suspension of 8 parts of finely divided isobutylated beta-naphthol in 400 parts of water containing 30 parts of ethyl alcohol and 7 parts of sodium hydroxide is prepared by the method described in Example 2, Part II.

*Part III.*—The solution of tetrazotized aminoazo compound resulting from the process of Part I is rapidly added to the suspension of isobutylated beta-naphthol of Part II at a temperature of 0° to 5° C. The mixture is stirred for about 8 to 10 hours, and the precipitated dyestuff is filtered off and washed with water until free from alkali and from chlorides. It is dried at 80° to 90° C.

The coloring matter thus obtained appears to be a pentakisazo body having the following probable formula:

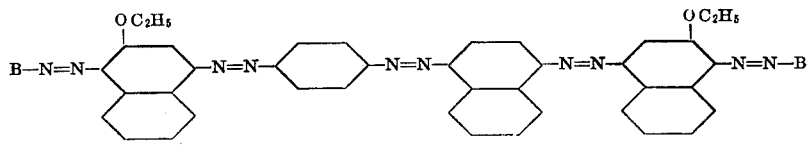

in which B represents the isobutylated beta-naphthol radical. It is a black powder insoluble in water, very slightly soluble in alcohol, soluble in benzene to form a black solution, and soluble in concentrated sulfuric acid giving a bluish-black solution which upon dilution with water gives a dirty brown solution.

By substituting alpha-naphthylamine for the 2-ethoxy-1-naphthylamine of the above Example 3, a dyestuff is obtained soluble in benezene to produce a brown solution.

Example 4

*Part I.*—13.8 parts of 1-methyl-2-aminobenzene-4-azoalpha-naphthylamine (prepared by coupling p-amino-o-nitro-toluene with alpha-naphthylamine and reducing the resulting product with sodium sulfide) are dissolved in 50 parts of 96 per cent sulfuric acid, the solution is cooled to 0° to 5° C., and 7.2 parts of sodium nitrite are added. After stirring the mixture for about 3 hours it is slowly poured onto 400 parts of ice. It is then stirred for 16 hours at 0° to 5° C.

*Part II.*—Amyl alcohol is condensed with beta-naphthol in the presence of zinc chloride in accordance with the procedure of Example 1. A finely divided suspension of 30 parts of the resulting amylated beta-naphthol in 575 parts of water containing 75 parts of ethyl alcohol and 22 parts of sodium hydroxide is prepared by the process described in Example 2, Part II.

*Part III.*—The tetrazotization reaction mixture resulting from the process of Part I is added to the suspension of amylated beta-naphthol of Part II at a temperature of 0° to 5° C., and the mixture is stirred at said temperature for about 10 to 16 hours. The precipitated dyestuff is filtered off, washed with water until free from alkali and chlorides, and dried at 80° to 90° C. The resulting product is a dark powder insoluble in water but quite soluble in benzene. It appears to be a trisazo dyestuff having the following probable formula:

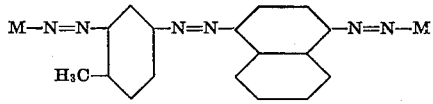

in which M represents the amylated beta-naphthol radical.

In a similar manner, other polyazo dyestuffs which contain the characteristic grouping

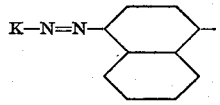

and particularly the characteristic grouping

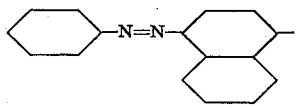

contained by the above products (in which K represents a benzene or naphthalene nucleus, and in which any of the benzene and/or naphthalene nuclei may be further substituted by halogen, alkyl, alkoxy, nitro, acyl, or arylene-azo radicals) may be obtained by coupling an alkylated naphthol with a diazotized, tetrazotized, etc., aminoazo compound containing the grouping

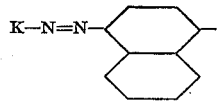

and particularly the grouping

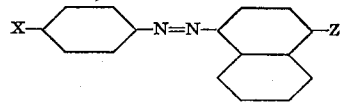

in which K represents a benzene or naphthalene nucleus and X and Z each represent an amino group or an amino azo residue of the benezene or naphthalene series, and in which any of the benzene and/or naphthalene nuclei may be further substituted by halogen, alkyl, alkoxy, nitro, acyl, or arylene-azo radicals.

Thus, dyestuffs soluble in benzene and related solvents to form black solutions are produced by coupling diazotized aminoazoxylene with 2-ethoxy-1-naphthylamine, diazotizing the resulting disazo-amino compound and coupling it with isobutylated beta-naphthol; or by coupling diazotized p-nitraniline with alpha-naphthylamine, reducing the resulting nitro-azo body, coupling diazotized oxalyl-m-phenylenediamine into the resulting diamino-azo compound, removing the oxalyl group by hydrolysis, hexazotizing the resulting disazo-triamino compound and coupling it with isobutylated beta-naphthol. A dyestuff soluble in benzene and related solvents to form greenish-black solutions is obtained by coupling diazotized alpha-naphthylamine with 2-ethoxy-1-naphthylamine, diazotizing the resulting aminoazo compound and coupling it with isobutylated beta-naphthol. Dyestuffs soluble in benzene and related solvents to form brownish-black solutions are obtained by coupling diazotized o-phenetidine with alpha-naphthylamine, diazotizing the resulting aminoazo compound and coupling it with isobutylated beta-naphthol; or by coupling diazotized o-anisidine with 1-naphthylamine, diazotizing the resulting aminoazo compound and coupling it with isobutylated beta-naphthol; or by coupling diazotized nitro-cresidine with alpha-naphthylamine, reducing the resulting nitroamino-azo body, tetrazotizing the resulting diamino-azo compound and coupling it with isobutylated beta-naphthol; or by coupling diazotized p-nitraniline with alpha-naphthylamine, reducing the resulting nitro-azo body, coupling diazotized o-xyladine into the resulting diamino-azo compound, tetrazotizing the resulting diamino-disazo compound, and coupling it with isobutylated beta-naphthol. A dyestuff soluble in benzene and related solvents to form a bluish-black solution is obtained by coupling diazotized p-nitraniline with alpha-naphthylamine, reducing the resulting nitroamino-azo body, coupling the resulting azo-diamino body with tetrazotized diaminotriphenylmethane, octazotizing the resulting tetra-amino tetrakisazo compound and coupling it with isobutylated beta-naphthol.

Dyestuffs soluble in benzene and related solvents to form brown solutions are produced by coupling diazotized aminoazo-xylene with alpha-naphthylamine, diazotizing the resulting amino disazo compound, and coupling it with isobutylated beta-naphthol; or by coupling diazotized alpha-naphthylamine with 2-ethoxy-1-naphthylamine, diazotizing the resulting aminoazo compound and coupling it with isopropylated beta-naphthol; or by coupling diazotized p-nitraniline with alpha-naphthylamine, diazotizing the resulting azoamino compound and coupling it with phenylmethylpyrazolone, reducing the resulting amino disazo compound, and coupling it with isobutylated beta-naphthol. A dyestuff soluble in benzene to form a bluish-brown solution in benzene and related solvents is produced by coupling diazotized dinitrobenzoyl aniline (resulting from the condensation of dinitro-chlorbenzene with p-aminobenzaldehyde) with 2-ethoxy-1-naphthylamine, diazotizing the resulting aminoazo compound and coupling it with isobutylated beta-naphthol. A dyestuff soluble in benzene and related solvents to form violet-brown solutions is obtained by coupling diazotized o-anisidine with 1-naphthylamine, diazotizing the resulting aminoazo compound and coupling it with benzylated beta-naphthol (obtained for example from benzyl alcohol and beta-naphthol in accordance with the process of Example 1). A dyestuff soluble in benzene and related solvents to form gray-brown solutions is obtained by coupling diazotized alpha-naphthylamine with 2-ethoxy-1-naphthylamine, diazotizing the resulting aminoazo compound and coupling it with isobutylated alpha-naphthol (obtained for example by substituting alpha-naphthol for the beta-naphthol in the process of Example 1).

The invention also includes other types of azo dyestuffs, and especially monazo dyestuffs, which contain the grouping

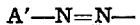

in which A' is the residue of an aromatic amino compound, which grouping is also characteristic of the dyestuffs hereinbefore mentioned.

*Example 5*

Part I.—8 parts of monobenzoyl-dianisidine hydrochloride are dissolved in 400 parts of water containing 11.6 parts of 20° Bé. hydrochloric acid and the solution is diazotized at 0° to 5° C. by the addition thereto of 2 parts of sodium nitrite dissolved in 30 parts of water.

Part II.—4.2 parts of crude isobutylated beta-naphthol produced (as described in Example 1) are dissolved in 20 parts of 95 per cent. ethyl alcohol and converted into a finely divided suspension by pouring into 400 parts of water containing 4 parts of sodium hydroxide.

Part III.—The solution of the diazotized amino compound resulting from the process of Part I is added to the suspension of isobutylated beta-naphthol produced by the process of Part II, and at a temperature of 0° to 10° C., and the mixture is stirred at said temperature for about 8 to 10 hours. The precipitated dyestuff is filtered off and washed with water until free from alkali and chlorides. It is dried at 80° to 90° C. The dyestuff thus obtained is a black powder insoluble in water, somewhat soluble in alcohol, and more so in benzene, giving in each case a violet solution, and soluble in concentrated sulfuric acid giving a greenish solution which upon dilution with water gives a violet-blue solution. It appears to be a monazo dyestuff having the following probable formula:

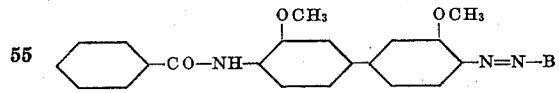

in which B represents the isobutylated beta-naphthol radical.

Dyestuffs soluble in benzene and related solvents to produce violet solutions are obtained by substituting benzylated beta-naphthol (produced from benzyl alcohol and beta-naphthol by the process of Example 1) for the isobutylated beta-naphthol of the above Example 5; or by substituting for the diazotized monobenzoyl-dianisidine hydrochloride of Part III of the above Example 5 the diazo-azo compound resulting from the coupling of one mol. of tetrazotized dianisidine with one mol. of phenylmethylpyrazolone.

*Example 6*

6.5 parts of amino-azo-o-xylene (produced from a xylidine mixture resulting from the nitration of o-xylene and reduction of the resulting nitro compounds) are added to 300 parts of water and diazotized at 0° C. by addition thereto of 17.4 parts of 20° Bé. hydrochloric acid and 2 parts of sodium nitrite dissolved in 10 parts of water. The diazo solution thus prepared is added to a finely divided suspension of isobutylated beta-naphthol (prepared as described in Example 2, Part II) and the mixture is stirred at 0° to 5° C. for about 10 to 16 hours. The precipitated azo dye is filtered off, washed and dried. The resulting product is a dark powder insoluble in water, slightly soluble in alcohol, and fairly soluble in benzene giving red solutions, and soluble in concentrated sulfuric acid giving a dull green solution which upon dilution with water turns to a dull purple.

In a similar manner dyestuffs soluble in benzene and related solvents to form red and scarlet solutions are respectively obtained by coupling diazotized alpha- or beta-naphthylamines with isobutylated beta-naphthol; a dyestuff soluble in benzene and related solvents to form orange solutions is obtained by coupling diazotized o-chlor-aniline with isobutylated beta-naphthol; a dyestuff soluble in benzene and related solvents to form orange solutions is obtained by coupling isobutylated beta-naphthol with diazotized dinitrobenzoyl-aniline (resulting from the condensation of dinitrochlor-benzene with p-aminobenzaldehyde); a dyestuff soluble in benzene and related solvents to form brown solutions is obtained by coupling tetrozotized diaminotriphenylmethane with alpha-naphthylamine, tetrazotizing the resulting diaminodisazo compound and coupling it with isobutylated beta-naphthol; and a dyestuff soluble in benzene and related solvents to form violet solutions is obtained by coupling diazotized 4'-ethoxy-4-aminodiphenylamine with isobutylated beta-naphthol.

The following examples are presented to illustrate specific uses of the dyestuffs in accordance with the present invention.

*Example 7*

A wood stain is prepared by dissolving the product of the above Example 2 in benzene to form a 4 per cent solution. The resulting stain may be applied to wood by brushing or spraying.

*Example 8*

A colored wax product is prepared by dissolving 4 parts of the product of the above Example 2 in 40 parts of stearic acid and stirring the resulting mixture with 50 parts of paraffin wax. By molding the resulting composition in the usual manner, colored candles may be obtained.

*Example 9*

A shoe polish is prepared by incorporating 0.5 part of the product of the above Example 2 with a mixture consisting of 12 parts carnauba wax, 6 parts ceresin wax, and 45 parts of turpentine. The resulting product is of particular value inasmuch as it does not soften in warm weather.

*Example 10*

A lacquer is produced by dissolving 4 parts of the products of the above Example 2 in a solution of 50 parts of an A-stage phenol-formaldehyde resin in 46 parts of benzene.

The dyestuffs of the present invention may also be employed for the coloring of resinous compositions, without the addition of a solvent, by incorporating the dyestuff in the powder form with the resinous composition in the powder form. Thus a black molded bakelite product is produced by incorporating the product of Example 2 or 3 with a bakelite molding powder and molding the resulting mixture under heat and pressure. In a similar manner black bakelite products are produced by employing the dyestuff obtained by coupling a diazotized aminoazoxylene with alpha- naphthylamine, diazotizing the resulting amino-disazo compound, and coupling it with isobutylated beta-naphthol; by employing the dyestuff obtained by coupling tetrazotized diaminotriphenylmethane with alpha-naphthylamine, tetrazotizing the resulting diamino-disazo compound and coupling it with isobutylated beta-naphthol; by employing the dyestuff obtained by coupling diazotized alpha-naphthylamine with 2-ethoxy-1-naphthylamine, diazotizing the resulting aminoazo compound and coupling it with isopropylated beta-naphthol; and by employing the dyestuff obtained by coupling diazotized o-anisidine with alpha-naphthylamine, diazotizing the resulting aminoazo compound and coupling it with benzylated beta-naphthol. A molded bakelite product colored a reddish violet is similarly obtained by incorporating the product of Example 6 with a bakelite molding powder and molding the resulting mixture under heat and pressure.

The following additional examples illustrate the production of dyestuffs of the present invention suitable for coloring wool.

Example 11

35.7 parts of aminoazobenzene disulfonic acid are dissolved in 2000 parts of water containing 4 parts of sodium hydroxide. 29 parts of 20° Bé. hydrochloric acid is added, the mixture is cooled to about 5° C. by addition of ice, and 7.2 parts of sodium nitrite dissolved in 20 parts of water are added to produce diazotization. The resulting diazo solution is added to a suspension of isobutylated beta-naphthol (prepared by dissolving 20 parts of isobutylated beta-naphthol in 75 parts of alcohol and adding the resulting alcoholic solution to 500 parts of water containing 5 parts of caustic soda), ice being added to keep the temperature at about 4° to 5° C. When the coupling is completed, the resulting disazo dye is salted out by addition thereto of common salt. The dyestuff thus obtained, after being dried, is a red powder, soluble in water and soluble in concentrated sulfuric acid to form a green solution which gives a brownish-red solution on dilution with water. From an acid bath, it dyes wool bright red shades.

Example 12

25.7 parts of p-aminobenzene-azo-salicylic acid is slurried with 100 parts water, and the slurry is added to 1000 parts of water containing 29 parts of 20° Bé. hydrochloric acid. After addition of ice to cool the solution to about 4° to 5° C., 7.2 parts of sodium nitrite are added to produce diazotization. The resulting diazo solution is added to a suspension of 10 parts of isopropylated beta-naphthol, prepared as described in Example 1. When the coupling is complete, the precipitated dye is filtered off. The dyestuff thus obtained, after being dried, is a bronzy green powder, insoluble in water. It dissolves in concentrated sulfuric acid giving a greenish-black solution which upon dilution with water gives a brownish precipitate. From an acid bath, it dyes wool bordeaux shades. It dyes cotton bordeaux shades from a neutral bath.

Example 13

11.4 parts of 2,1-amino-naphthalene-sulfonic acid (Tobias acid) is dissolved in 200 parts of water containing 2 parts of sodium hydroxide. 14.5 parts of 20° Bé. hydrochloric acid is added and the mixture is treated in the usual manner at 4° to 5° C. with 7 parts of sodium nitrite to produce diazotization. The resulting diazo solution is then quickly added to a suspension of 10 parts of isobutylated beta-naphthol (prepared as described in Example 2, Part II). When the combination is completed, the dyestuff, which is in the form of a precipitate, is filtered off and washed with water. After being dried, the dyestuff is a bronzy powder. It is sparingly soluble in water at room temperature. It dissolves in concentrated sulfuric acid giving a brownish precipitate. From a neutral bath, it dyes wool an orange shade.

A dyestuff dyeing wool red shades from a neutral bath is obtained in accordance with the process of the above Example 9 by substituting for the isobutylated beta-naphthol of said example isobutylated Naphthol AS (isobutylated 2,3-hydroxynaphthoic acid anilide) which may be obtained for example by condensing isobutyl alcohol with the anilide of 2,3-hydroxynaphthoic acid in accordance with the process of Example 1.

I claim:
1. A process of making an azo dye which comprises heating beta-naphthol with a butyl alcohol and a metal halide condensing agent, whereby a butylated beta-naphthol is produced, and coupling the resulting butylated beta-naphthol with a diazotized aromatic amino azo compound containing a benzene azo naphthalene radical.

2. A process of making an azo dye which comprises heating beta-naphthol with isobutyl alcohol in the presence of zinc chloride as a condensing agent, whereby isobutylated beta-naphthol is produced, and coupling the resulting isobutylated beta-naphthol with tetrazotized p-aminobenzene-azo-alpha-naphthylamine.

3. A process of making an azo dye which comprises heating beta-naphthol with isobutyl alcohol in the presence of zinc chloride as a condensing agent, whereby isobutylated beta-naphthol is produced, and coupling the resulting isobutylated beta-naphthol with a diazotized aromatic amino azo compound containing a benzene azo naphthalene radical.

4. A polyazo dyestuff containing an alkylated napthol containing at least 3 carbon atoms in the alkyl radical.

5. A polyazo dyestuff obtainable by coupling 1 mol. of a diazotized aromatic azo diamine with 2 mols of a butylated naphthol.

6. A polyazo dyestuff having the general formula G—N=N—(Y—N=N)$_n$—G in which G is an alkylated naphthol containing at least 3 carbon atoms in the alkyl radical, Y is an aromatic residue selected from the group consisting of the aromatic residues of the benzene and naphthalene series, and $n$ is 1 or more.

7. A polyazo dyestuff having the general formula E—N=N—Y—N=N—Y'—N=N—E in which Y and Y' are aromatic residues selected from the group consisting of the aromatic residues of the benzene and naphthalene series and E is an alkylated naphthol in which the alkyl group is a branched chain hydrocarbon radical.

8. A polyazo dyestuff having the general formula B—N=N—Y—N=N—Y'—N=N—B in which Y and Y' are aromatic residues selected from the group consisting of the aromatic residues of the benzene and naphthalene series and B is the isobutylated beta-naphthol radical.

9. A polyazo dyestuff having the general formula

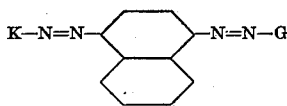

in which K is an aromatic residue of the benzene or naphthalene series free from acid salt forming groups and G is an alkylated naphthol containing at least 3 carbon atoms in the alkyl radical.

10. A polyazo dyestuff having the general formula

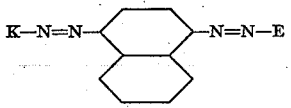

in which K is a radical of the benzene or naphthalene series free from acid salt forming groups and E is an alkylated naphthol in which the alkyl group is a branched chain hydrocarbon radical.

11. A polyazo dyestuff having the general formula B'—N=N—D—N=N—B' in which D is the residue of an aromatic azo compound free from acid salt forming groups and containing a benzene azo naphthalene residue and B' is a butylated beta-naphthol radical, said dyestuff being soluble in oils, fats and waxes.

12. An azo dyestuff obtainable by coupling a diazotized aromatic amino compound containing at least one nucleus selected from the group consisting of the arylazo and naphthalene nuclei with an alkylated naphthol containing at least 3 carbon atoms in the alkyl radical.

13. A polyazo dyestuff having the general formula B—N=N—(Y—N=N)$_n$—B in which Y is an aromatic radical selected from the group consisting of the aromatic radicals of the benzene and naphthalene series, $n$ is 1 or more, and B is the isobutylated beta-naphthol radical.

14. An azo dyestuff having the general formula

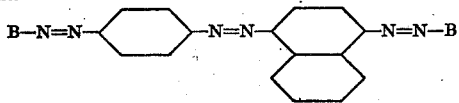

in which B is the isobutylated beta-naphthol radical, said dyestuff being a bronzy black powder insoluble in water, soluble in concentrated sulfuric acid giving a blue solution which upon dilution with water gives a violet solution, soluble in benzene, ethyl acetate, turpentine, gasoline and castor-oil to produce reddish violet to black solutions, and very slightly soluble in denatured alcohol.

15. A polyazo dyestuff obtainable by coupling a diazotized aromatic azo amino compound with an alkylated naphthol having a side chain containing at least 3 carbon atoms.

16. A polyazo dyestuff having the general formula E—N=N—Y'—(N=N—Y)$_n$—N=N—E in which Y and Y' are aromatic residues selected from the group consisting of the aromatic residues of the benzene and naphthalene series, E is an alkylated naphthol in which the alkyl group is a branched chain hydrocarbon radical, and $n$ is one or more.

17. An azo dyestuff obtainable by coupling a diazotized arylamine containing a radical selected from the group consisting of the aryl azo and naphthalene radicals with an alkylated naphthol in which the alkyl group is a branched chain hydrocarbon radical.

18. A polyazo dyestuff obtainable by coupling one mol. of a diazotized aromatic azo amino compound containing prior to diazotization $n$ primary amino groups with $n$ mols of an alkylated naphthol having a side chain containing at least 3 carbon atoms; $n$ representing 2 or more.

19. A polyazo dyestuff obtainable by coupling one mol. of a diazotized aromatic azo amino compound containing prior to diazotization $n$ primary amino groups with $n$ mols of an alkylated naphthol in which the alkyl group is a branched chain hydrocarbon radical; $n$ representing 2 or more.

20. A polyazo dyestuff obtainable by coupling a diazotized arylazo naphthylamine with an alkylated naphthol in which the alkyl group is a branched chain hydrocarbon radical.

KARL F. CONRAD.